Sept. 15, 1959 J. J. ZOETEMELK 2,903,838
PLURAL CUT LAWN EDGE TRIMMER
Filed Jan. 6, 1958 2 Sheets-Sheet 2
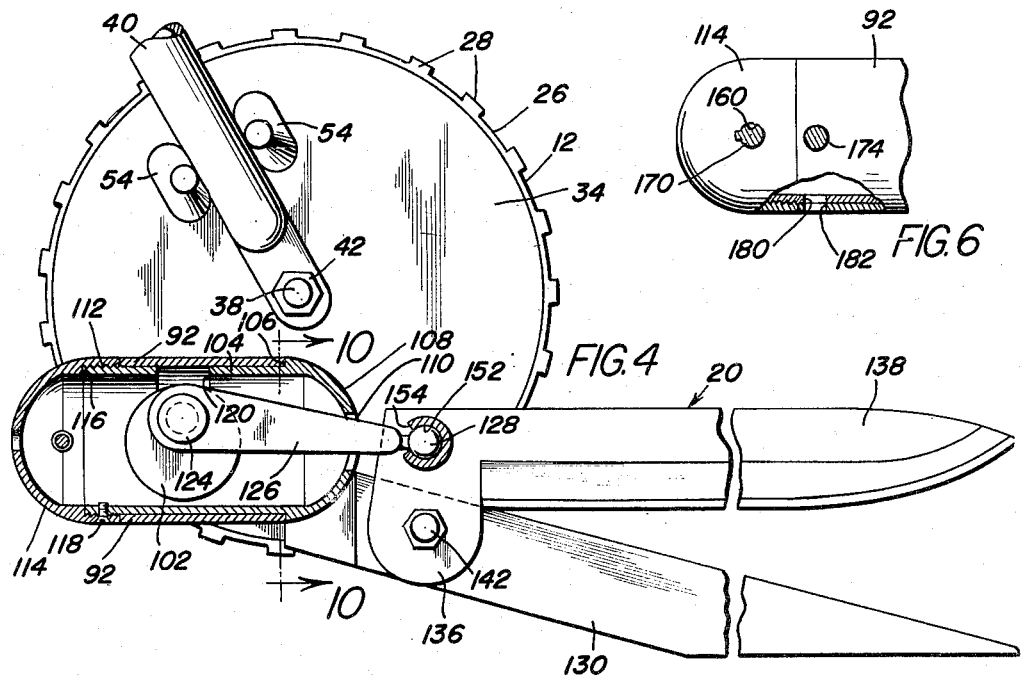
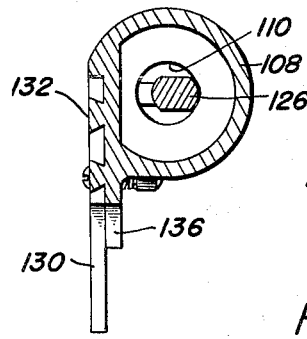
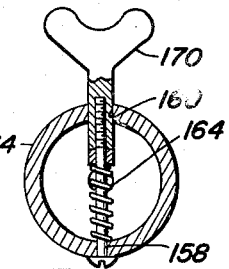
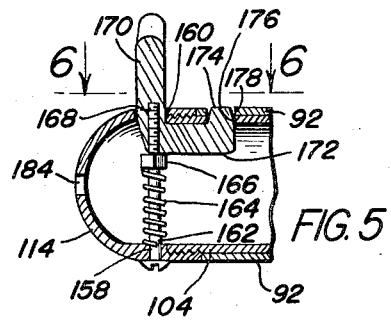
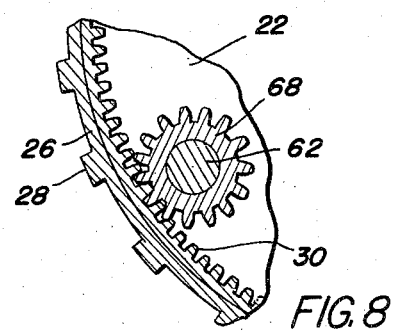
INVENTOR
JACOBUS J. ZOETEMELK
BY Samuel Meerkreebs
ATTORNEY United States Patent Office 2,903,838
Patented Sept. 15, 1959

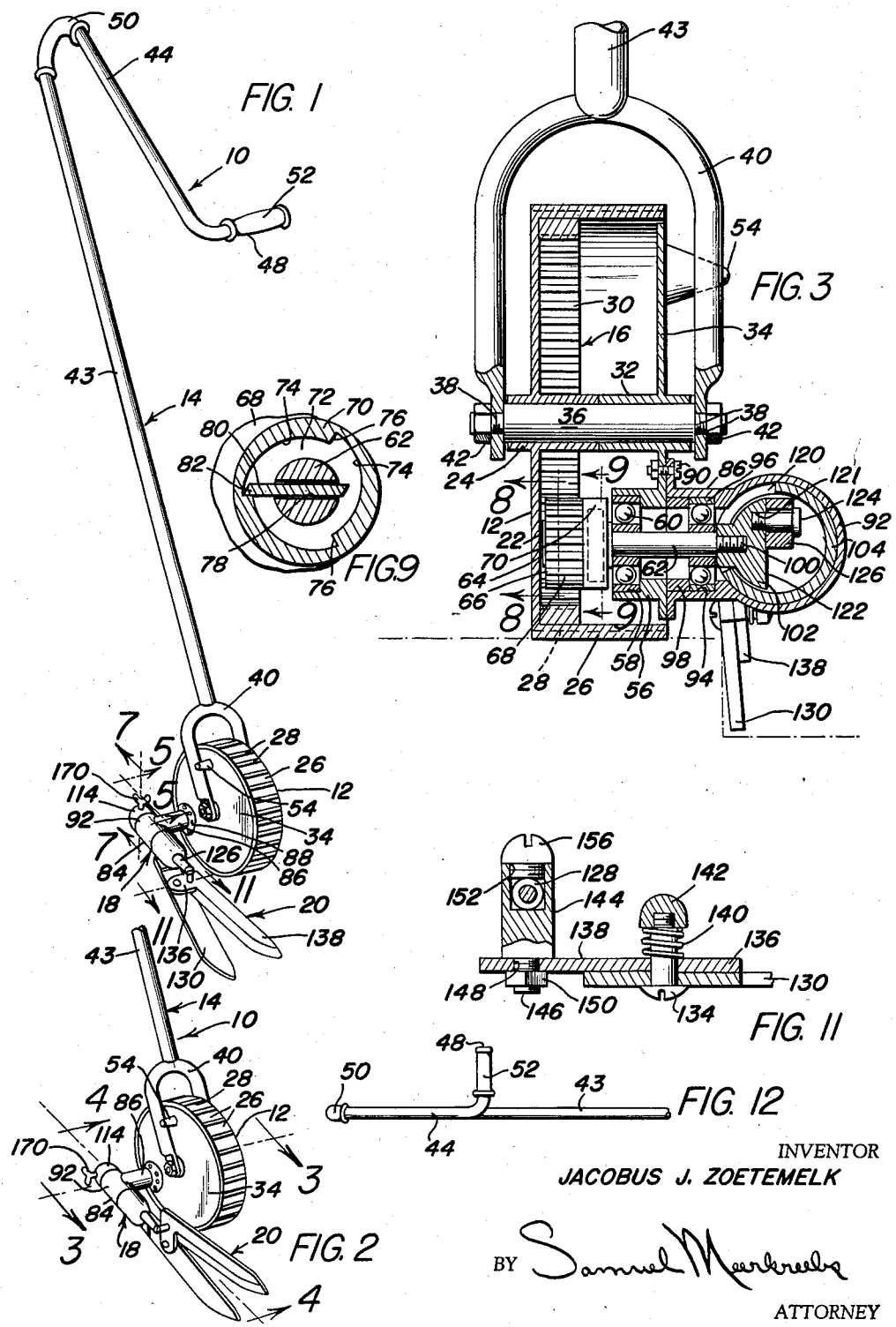

2,903,838
PLURAL CUT LAWN EDGE TRIMMER
Jacobus J. Zoetemelk, Toronto, Ontario, Canada
Application January 6, 1958, Serial No. 707,263
3 Claims. (Cl. 56—246)

This invention relates to improvements in mechanically operated lawn edge trimmers.

When trimming the edges of lawns by hand shears, this operation is generally time consuming and arduous. Although various types of power driven lawn edgers have been proposed, the rapidly moving blades of power driven edgers inherently constitute a potential source of accidents as well as constituting a considerable investment.

In order to do a complete job when mowing a lawn, grass beneath bushes or against a stone wall, for example, must be trimmed by cutting in a horizontal plane, and when trimming grass next to a walk or curb or edges along borders, or for example in a preformed trench, the cutting must generally be done in a vertical plane.

A primary object of this invention is to provide an operator propelled lawn edge trimmer including means for optionally trimming in a vertical or horizontal cutting plane.

Another object of this invention is to provide an operator propelled lawn edge trimmer including a ground engaging wheel including a drive assembly operating a transmission assembly upon which a shear assembly is supported, the shear assembly including means adjustably retaining the shearing portion thereof in a position for cutting in a vertical or horizontal plane in response to movement of the ground wheel being propelled adjacent that portion of a lawn or the like which is being trimmed.

A still further object of this invention is to provide an improved mechanically operated operator propelled lawn edge trimmer which is easily used, and versatile and practical in its application.

Other objects and advantages of the invention will become apparent during the course of the following description.

In the drawings there is shown one preferred embodiment of the invention. In this showing:

Figure 1 is a perspective view of the improved lawn edge trimmer showing the shear assembly in a position for cutting in a horizontal plane;

Figure 2 is a fragmentary perspective view, similar to Figure 1, showing the shear assembly in a position for cutting in a vertical plane;

Figure 3 is an enlarged vertical section taken substantially on line 3—3 of Figure 2, portions being broken away and shown in section for clarity;

Figure 4 is an enlarged section taken substantially on the plane of line 4—4 of Figure 2, intermediate portions of the blades of the shear assembly being removed;

Figure 5 is an enlarged fragmentary section taken substantially on the plane of line 5—5 of Figure 1;

Figure 6 is a section taken on line 6—6 of Figure 5;

Figure 7 is an enlarged section taken on line 7—7 of Figure 1;

Figure 8 is a fragmentary section taken on line 8—8 of Figure 3;

Figure 9 is an enlarged section taken on line 9—9 of Figure 3, showing the one-way clutch used in the drive assembly of the lawn edge trimmer;

Figure 10 is a section taken substantially on line 10—10 of Figure 4;

Figure 11 is a further enlarged section taken on line 11—11 of Figure 1, a portion being broken away and shown in section for clarity; and Figure 12 is a fragmentary top plan view of the handle of the mower.

Referring to the drawings in detail, the lawn edge trimmer of this invention is indicated generally at 10 including a ground engaging wheel 12 having mounted on its axis of rotation as will subsequently become apparent a handle assembly indicated generally at 14, the wheel 12 including therein a drive assembly indicated generally at 16, see Figure 3. Extending laterally from one side of the wheel is a transmission assembly indicated generally at 18 and extending forwardly from the transmission assembly is a shear assembly indicated generally at 20.

As most clearly seen in Figure 3, the wheel 12 comprises a circular disc 22 integral with a transverse axial support sleeve 24 and an annular flange 26, the outer periphery of which includes a plurality of transverse tread portions 28. Secured adjacent the inner surface of the disc 22 about the inner periphery of the flange 26 is a concentrically disposed ring gear 30 forming a portion of the drive assembly 16. The tubular sleeve 24 defines the axis of rotation of the wheel and has in axial alignment therewith a tubular hub 32 formed integral with a circular support plate 34. The sleeve 24 and tubular hub 32 have extending therethrough an axle or support shaft 36, opposite ends of which being reduced in diameter and externally threaded as indicated at 38, the reduced diametered externally threaded portions extending through suitable aligned apertures of a bifurcated mounting fork 40 of the handle 14. The fork is retained on the portions 38 by means of suitable nuts 42. The bifurcated fork 40 is formed integrally with an elongated tubular handle 43 including an overlying reverse bend portion 44 which terminates in a lateral extension 48. The portions 44 and 48 have secured thereon in any suitable manner suitable hand grips 50 and 52, respectively, to be grasped in the hands of an operator propelling the lawn edger.

The plate 34 has extending laterally from the upper outer surface thereof a pair of spaced stop elements 54 which will be disposed on opposite sides of the adjacent leg of the fork 40 preventing rotation of the plate 34 as the wheel rotates.

The plate 34 has formed integrally therewith an inwardly extending tubular support hub 56, see Figure 3, undercut as indicated at 58 for receiving a ball bearing assembly 60 therein. Extending axially through the ball bearing assembly 60 is a drive shaft 62 terminating adjacent the inner surface of the plate 22 in an enlarged headed portion 64 and having journalled thereon a combined pinion drive gear and one-way drive clutch indicated generally at 66. The combined pinion gear and drive clutch includes a pinion gear 68 intermeshed and rotated by the ring gear 30, the pinion gear 68 including an integral annular flange portion 70 incorporating a recessed portion 72, see Figure 9, comprising arcuate camming edges 74 terminating in abutment shoulders 76. That portion of the shaft 62 which extends through the recess 72 incorporates a diametrical slot 78 reciprocably receiving therein a clutch element 80, the terminal end 82 of which being engageable with the abutment shoulder 76. Thus when the pinion gear 68 is rotated, during forward movement of the wheel 12 the drive shaft 62 will be rotated. Rearward movement of the wheel 12 results in free wheeling between the drive shaft 62 and wheel 12.

The transmission assembly 18 includes a T-shaped tubular support member 84, see Figure 1, the lateral leg 86 of which being in axial alignment with the hub 56 formed on the plate 34, the tubular support member 84 being secured on the outer surface of the plate 34 by means of an annular flange 88 on the leg 86 by means of suitable nut and bolt assemblies 90. The transverse leg or head of the support member 84 as indicated at 92 extends in the direction of travel of the lawn edger. The leg 86 is undercut as indicated at 94 receiving therein a suitable ball bearing assembly 96 and spacer collar or washer 98. The drive shaft 62 extends through the ball bearing assembly 96 terminating in a reduced diameter threaded portion 100, having left hand threads formed thereon, to which is secured a hemispherical crank disc 102, see Figure 3. Journalled within the portion 92 of the T-shaped support member 84 is a tubular sleeve 104 undercut at 106, see Figure 4, to abut the forward end of the portion 92, the sleeve 104 terminating in a dome shape as indicated at 108 which incorporates a circular aperture 110 therethrough. The opposite end of the sleeve 104 is externally threaded as indicated at 112 incorporating thereon a cap element 116 undercut to provide a shoulder 114 which abuts the rear end of portion 92. A suitable lock screw 118 extends through aligned aperture portions for retaining the cap 116 fixed relative to the sleeve 104. The side of the sleeve 104 adjacent the drive shaft 62 has therethrough an arcuate slot 120, see Figures 3 and 4, and the crank disc is disposed within the sleeve 104.

The crank disc 102 has formed therein a tapped bore 121 opening into its side 122 eccentric relative to the longitudinal axis of the drive shaft 62 and receiving therein a suitable crank pin 124. The crank pin 124 has journalled thereon the rear end of a force transmitting rod 126 which extends through the circular aperture 110 of the sleeve 104 terminating in a spherical ball bearing element 128, see Figure 4. Without describing the shear assembly 20, it will be noted that the sleeve 104 may be rotated about the force transmitting rod 126, this expedient facilitating horizontal and vertical cutting.

The shear assembly 20 includes a fixed blade 130, the rear end of which, see Figure 10, being juxtaposed on and secured to suitably formed portion of the sleeve 104 as indicated at 132. Extending through an intermediate apertured portion of the blade 130 is a pivot screw 134, see Figure 11, receiving thereon an offset portion 136 of the movable or pivotal blade 138 of the shear assembly 20. A suitable compression spring 140 is provided on the screw 134 being retained thereon by means of a suitable cap nut 142 affording desired pressure between the cooperating cutting edges of the blades. The blade 138 has extending normal from its upper surface a tubular element 144, which may conveniently include an externally threaded stud portion 146 extending through an apertured portion 148 of the blade 138, see Figure 11, and receiving thereon a retaining nut 150. The ball portion 128, see Figures 4 and 11, is received within a socket portion 152 which opens toward the circular aperture 110 of the sleeve 104. The upper portion of the socket 152 is tapped to receive a retaining screw 156.

The shear assembly 20 may be rotated about the force transmitting rod 126 alternatively to the position shown in Figures 1 or 2 to thus afford cutting in a horizontal or vertical plane, respectively. In order to retain the shear assembly in the alternative position shown, suitable latch means is provided between the support member 84 and the sleeve 104, see Figures 5, 6 and 7. The latch means includes a pair of diametrically aligned apertures 158 and 160 through the cap element 116, the aperture 158 being of a relatively smaller diameter than the aperture 160 and having extending therethrough an elongated screw element 162. Circumposed about the screw element 162 is a compression spring 164 which receives thereon a spacer ring 166, the upper end of the screw element 162 being threaded as indicated at 168 and being received in the bottom of a L-shaped lock or latch element 170. The latch element 170 may be depressed by means of one's hand or foot, and includes a forwardly extending leg portion 172 terminating in an upwardly extending finger portion 174. The finger portion 174 will extend through pairs of alignable apertures 176 and 178 or 180 and 182, respectively formed in the sleeve 104 and portion 92 of the support member 84, being radially spaced at approximately 90 degrees. The cap element 116 may include an aperture 184 facilitating the assembly of the lawn edger.

The manner in which the lawn edger may be utilized for both vertical and horizontal trimming is believed to be readily apparent, and accordingly further description of the parts and operation is believed to be unnecessary. It is to be understood that the form of the invention shown and described is to be taken as the preferred example of the same, and that adaptations and various changes in the shape, size and arrangement of the parts may be made as do not depart from the spirit of the invention or the scope of the appended claims.

I claim:

1. An operator-propelled lawn edge trimmer comprising a ground engaging wheel, a handle on said wheel, a drive assembly in said wheel, a transmission assembly on said wheel, projecting laterally therefrom and operatively connected to said drive assembly, said transmission assembly including means converting rotary movement of the wheel to oscillatory movement laterally of said wheel, and a shear assembly having a cutting plane extending laterally, forwardly of said wheel and adjacent the lower periphery thereof, said shear assembly including an elongated fixed blade and an oscillatory blade pivoted intermediately on said fixed blade, said oscillatory blade being operatively connected to said transmission assembly and operable in the cutting plane of said fixed blade, said transmission assembly including adjustment means permitting simultaneous rotation of said fixed and pivotal blades into a fixed vertical or horizontal cutting plane with the vertical cutting plane extending below said wheel, transmission assembly comprising a tubular body supported laterally of said wheel and opening in the direction of travel of said wheel, force transmitting means in said tubular body member operatively connected to said drive assembly and pivotal blade, said force transmitting means including an oscillatory connection on said pivotal blade permitting rotation of said shear assembly about the longitudinal axis of said tubular body member, a sleeve journalled on said tubular body to which said fixed blade is secured, said adjustment means including manually operated latch means engageable between said tubular body and sleeve for fixing the cutting plane in which said shear assembly operates.

2. In a lawn edge trimmer as set forth in claim 1 in which said wheel comprises an annular ring, said handle including a portion mounted on the axis of rotation of said wheel, said drive assembly comprising a ring gear formed on the inner periphery of said annular ring, a pinion gear meshed with said ring gear and including a drive shaft extending laterally from said wheel, said wheel including a support plate fixed relative to said handle through which said drive shaft extends, said transmission assembly being mounted on said support plate.

3. In a lawn edger as set forth in claim 2 including one-way clutch means interposed between said pinion gear and drive shaft providing a driving connection to said shear assembly only when said wheel is moved forwardly.

References Cited in the file of this patent

UNITED STATES PATENTS

| | | |
|---|---|---|
| 362,516 | Kenyon | May 10, 1887 |
| 787,214 | Peters | Apr. 11, 1905 |
| 793,705 | Winsor | July 4, 1905 |
| 1,131,156 | Olds | Mar. 9, 1915 |
| 2,188,961 | Scofield | Feb. 6, 1940 |
| 2,491,993 | McClay, Sr. | Dec. 20, 1949 |